US009569525B2

(12) United States Patent
Spangler et al.

(10) Patent No.: US 9,569,525 B2
(45) Date of Patent: Feb. 14, 2017

(54) TECHNIQUES FOR ENTITY-LEVEL TECHNOLOGY RECOMMENDATION

(71) Applicant: International Business Machines Corporation, Armonk, NY (US)

(72) Inventors: William Scott Spangler, San Martin, CA (US); Qi He, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 14/029,369

(22) Filed: Sep. 17, 2013

(65) Prior Publication Data
US 2015/0081654 A1 Mar. 19, 2015

(51) Int. Cl.
G06F 17/30 (2006.01)

(52) U.S. Cl.
CPC ............... *G06F 17/30646* (2013.01)

(58) Field of Classification Search
CPC .......... G06F 17/30598; G06F 17/30752; G06F 17/30604; G06F 17/30646
USPC ........................................................ 707/748
See application file for complete search history.

(56) References Cited

U.S. PATENT DOCUMENTS

| 7,092,953 | B1* | 8/2006 | Haynes ............. G06F 17/30011 705/51 |
| 8,150,757 | B1* | 4/2012 | Sieffert ................. G06Q 30/06 705/26.1 |
| 8,301,623 | B2 | 10/2012 | Chakrabarti et al. |
| 8,315,915 | B1 | 11/2012 | Katz et al. |
| 8,782,042 | B1* | 7/2014 | Cooke et al. ................. 707/729 |
| 8,862,534 | B1* | 10/2014 | Faratin ............. G06F 17/30616 706/45 |
| 2002/0138465 | A1* | 9/2002 | Lee .................. G06F 17/30011 |
| 2005/0210008 | A1* | 9/2005 | Tran ................. G06F 17/30864 |
| 2008/0294621 | A1* | 11/2008 | Kanigsberg ....... G06F 17/30867 |
| 2010/0198837 | A1* | 8/2010 | Wu et al. ...................... 707/748 |
| 2012/0078612 | A1* | 3/2012 | Kandekar ........... G06F 17/2745 704/9 |

(Continued)

OTHER PUBLICATIONS

Li et al. Enhancing Biomedical Named Entity Classification using Terabyte Unlabeled Data, in Proceedings of the 4th Asia Information Retrieval Conference on Information Retrieval Technology, 2008.

(Continued)

*Primary Examiner* — James Trujillo
*Assistant Examiner* — Jessica N Le
(74) *Attorney, Agent, or Firm* — Ryan, Mason & Lewis, LLP

(57) ABSTRACT

Methods, systems, and articles of manufacture for entity-level technology recommendation are provided herein. A method includes searching a first query against a first corpus of documents to determine a set of documents matching an entity of interest identified in the first query, generating a list of technologies that (i) appear within the content of the set of documents and (ii) are associated to the entity of interest, searching a second query against a second corpus of documents to determine a set of documents representing a technology recommendation for the entity of interest, wherein said second query is based on one or more selected technologies from the list of technologies, and outputting the set of documents representing a technology recommendation to a user and/or a display.

17 Claims, 4 Drawing Sheets

(56) References Cited

U.S. PATENT DOCUMENTS

| | | |
|---|---|---|
| 2012/0265701 A1 | 10/2012 | Thomas |
| 2012/0296849 A1 | 11/2012 | Lortscher, Jr. |
| 2012/0330992 A1 | 12/2012 | Kanigsberg et al. |
| 2013/0054290 A1 | 2/2013 | Coyne |
| 2013/0097664 A1 | 4/2013 | Herz et al. |
| 2014/0114962 A1* | 4/2014 | Rosenburg et al. ........... 707/723 |
| 2014/0280044 A1* | 9/2014 | Huynh et al. ................. 707/722 |
| 2014/0337280 A1* | 11/2014 | Bergstrom et al. ........... 707/608 |

OTHER PUBLICATIONS

Schafer et al., Recommender Systems in E-Commerce, GroupLens Research Project Department of Computer Science and Engineering University of Minnesota, Minneapolis, MN 55455 1-612-625-4002, 1999.

Laliwala et al. Semantic and Rule Based Event-driven Services-Oriented Agricultural Recommendation System, Dhirubhai Ambani-Institute of Information and Communication Technology, Gandhinagar, 382007, India, Proceedings of the 26th IEEE International Conference on Distributed Computing Systems Workshops (ICDCSW'06) 2006.

Cohen et al., Exploiting Dictionaries in Named Entity Extraction: Combining Semi-Markov Extraction Processes and Data Integration Methods. In Proceedings of the 10th ACM SIGKDD International Conference on Knowledge Discovery and Data Mining, 2004.

Collins et al., Unsupervised Models for Named Entity Classification. In Proceedings of the Joint SIGDAT Conference on Empirical Methods in Natural Language Processing and Very Large Corpora, 1999.

Cucerzan, Large-scale Named Entity Disambiguation Based on Wikipedia Data. In Proceedings of EMNLP-CoNLL 2007, 2007.

Dredze et al., Entity Disambiguation for Knowledge Base Population, in Proceedings of the 23rd International Conference on Computational Linguistics, 2010.

Etzioni et al., Unsupervised Named-Entity Extraction from the Web: An Experimental Study, Artificial Intelligence, 165:91-134, 2005.

Johnson et al., A Decision-Tree-Based Symbolic Rule Induction System for Text Categorization, IBM Systems Journal, 41(3):428-437, 2002.

Nadeau et al. A Survey of Named Entity Recognition and Classification, Lingvisticae Investigationes, 30(1):3-26, Jan. 2007.

Ni et al., Enhancing the Open-Domain Classification of Named Entity Using Linked Open Data, In Proceedings of the 9th International Semantic Web Conference on the Semantic Web, 2010.

Riloff et al., Learning Dictionaries for Information Extraction by Multi-Level Bootstrapping. In Proceedings of the sixteenth National Conference on Artificial Intelligence and the Eleventh Innovative Applications of Artificial Intelligence Conference Innovative Applications of Artificial Intelligence, 1999.

Salton et al., Term-Weighting Approaches in Automatic Text Retrieval, Information Processing and Management, 4(5):513-523, 1988.

Spangler et al. Simple: Interactive Analytics on Patent Data, In Visual Analytics and Knowledge Discovery—VAKD, 2010.

Spangler et al., Modeling Document Taxonomies, IBM Research, Almaden Research Center, 2002.

Whitelaw et al., Web-Scale Named Entity Recognition. In Proceeding of the 17th ACM Conference on Information and Knowledge Management, 2008.

* cited by examiner

202

1. Initialization.
1.1) Map training data $T$ to Wikipedia data $W$.
1.2) Set $S_p = T \cap W$ as the positive training seed set. The negative training seed set $S_n = \emptyset$.
1.3) Learn the starting decision tree from $S_p$ and $S_n$. Induce the starting rule set $R_0$ from the tree.

2. Induce new rules.
for $k := 1$ to $K$ do
  2.1) Randomly sample $n$ Wikipedia entities $E_k$ from $E$ with replacement.
  2.2) Label the $n$ entities using $R_{k-1}$. Examples where no rule applies are assigned to class $\bar{C}_i$ by default. The $n$ entities $E_k$ are split into two parts: $E_k^p$ (positive examples) and $E_k^n$ (negative examples).
  2.3) Data Integration: Generate a new positive training data set $S_p = S_p \cup (E_k^p \cap P)$, and a new negative training data set $S_n = S_n \cup (E_k^n - E_k^n \cap P)$.
  2.4) Induce a new set of rules $R_k$ from $S_p$ and $S_n$.
  2.5) Quit condition.
  if $|R_k| - |R_{k-1}| < \emptyset$ then
    Quit from the for loop.
  end if
end for

3. Output: $R_k$, the final classification rule set.

FIG. 2

TECHNIQUES FOR ENTITY-LEVEL TECHNOLOGY RECOMMENDATION

FIELD OF THE INVENTION

Embodiments of the invention generally relate to information technology, and, more particularly, to technology asset management.

BACKGROUND

Licensing technological information such as intellectual property (IP) includes selling certain rights to third-party individuals and/or business. Traditionally, entities and/or individuals have needed to manually identify and select potentially appropriate technological information for licensing purposes from large amounts of data. Such searching for appropriate technologies from large data sources is a labor-intensive task. Accordingly, a need exists for leveraging knowledge bases in the selection of unlabeled data in furtherance of named entity classification.

SUMMARY

In one aspect of the present invention, techniques for entity-level technology recommendation are provided. An exemplary computer-implemented method can include steps of searching a first query against a first corpus of documents to determine a set of documents matching an entity of interest identified in the first query; generating a list of technologies that (i) appear within the content of the set of documents and (ii) are associated to the entity of interest; searching a second query against a second corpus of documents to determine a set of documents representing a technology recommendation for the entity of interest, wherein said second query is based on one or more selected technologies from the list of technologies; and outputting the set of documents representing a technology recommendation to a user and/or a display.

In another aspect of the invention, an exemplary computer-implemented method can include steps of receiving a name of an entity of interest to be used as a first query; searching the first query against a first corpus of documents to determine a set of documents matching the entity of interest; generating a list of technologies that (i) appear within the content of the set of documents and (ii) are associated to the entity of interest; receiving a second query based on one or more technologies from the list of technologies; submitting the second query into a document search engine to determine a set of documents representing a technology recommendation for the entity of interest; and outputting the set of documents representing a technology recommendation to a user and/or a display as a ranked list of documents.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 illustrates a data integration algorithm for named entity classification, according to an aspect of the invention;

DETAILED DESCRIPTION

Figure 1:
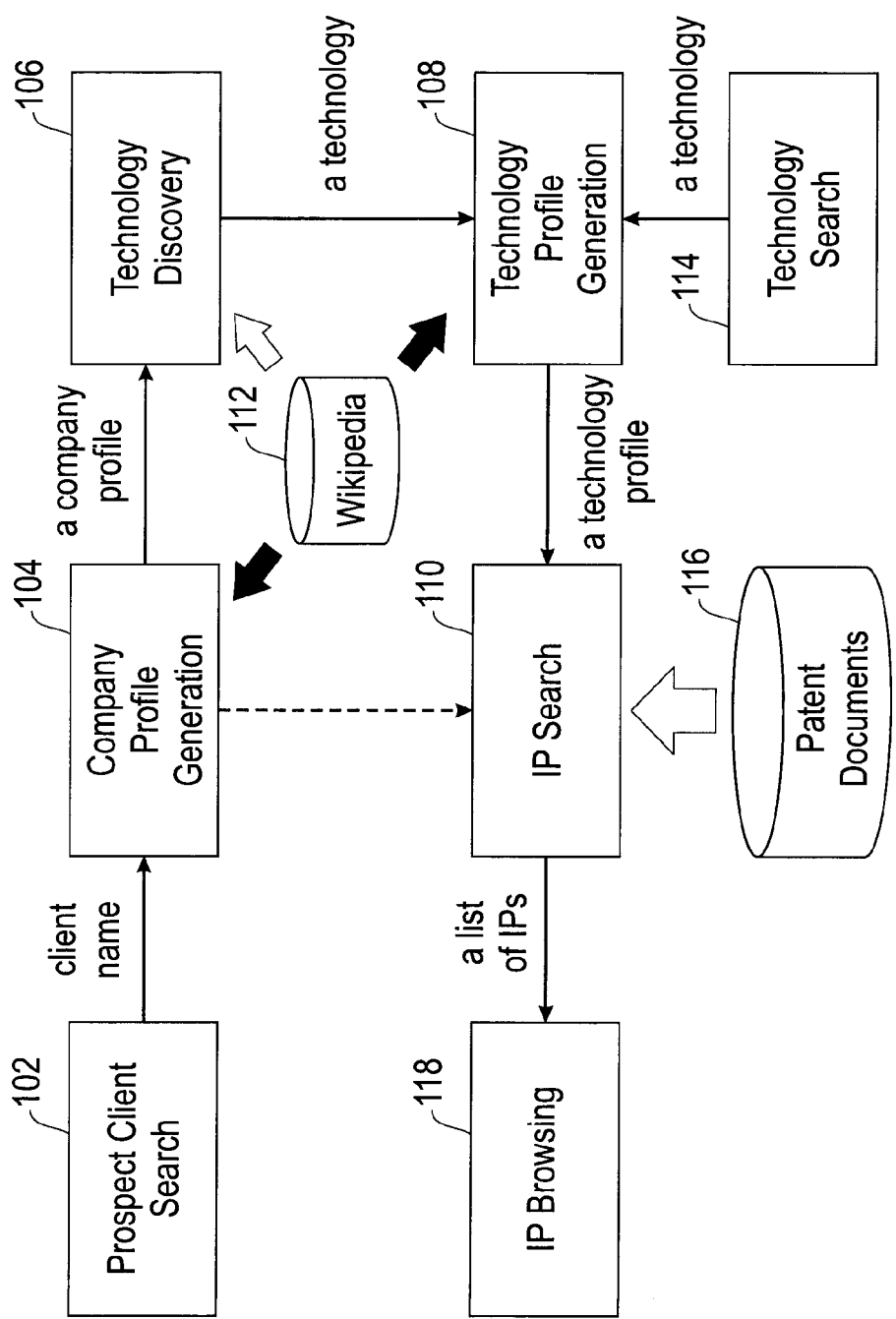
FIG. 1 is a diagram illustrating an example embodiment, according to an aspect of the invention.

As described herein, an aspect of the present invention includes an entity-level technology recommendation system. At least one embodiment of the invention includes providing an entity-level data analytics platform for recommending a technology instantiation from a repository of scientific documents. Lists of technology items recommended, for example, to clients, can further be organized by building a technology graph wherein the nodes of the graph are technology terms and there is a directed edge from technology term A to technology term B if there is a hyperlink to the technology term B in the reference page (for example, an encyclopedia page) of the technology term A. Additionally, in at least one embodiment of the invention, for each of the similar scientific documents, one snippet matching the greatest number of technology terms from a second query is displayed to the user.

By way merely of illustration and example, one or more embodiments of the invention described herein are described within the context of intellectual property (IP) (such as patent, copyright, and trademark) information and searches. Accordingly, such an example embodiment of the invention includes enabling an automatic search of IP materials from one or more large data sources for licensing to a given prospective client. By identifying a prospective client as input, such an example embodiment of the invention can output a list of IP materials for licensing to the client.

Such an embodiment includes modeling two heterogeneous entities (in this example, the prospective client and IP materials) using the same language dictionary L. Accordingly, both the prospective client and the IP materials are modeled in the same vector space that includes word/term dimensions from the same language dictionary L. Subsequently, standard distance metrics such as, for example, cosine similarity, can be directly applied to the input to compute the relevance of one entity to another.

Additionally, such an example embodiment of the invention includes selecting and analyzing proper data sources so that the profiles of the prospective client and the IP materials can be modeled in the same technology space. Knowledge bases (such as, for example, Wikipedia®) and/or external dictionaries that provide rich a priori knowledge about entity information are publicly available and can be applied in named entity recognition. Accordingly, at least one embodiment of the invention includes using one or more such sources as data sources to model the profiles of a prospective client and technology materials.

As such, in at least one embodiment of the invention, items of data are converted into knowledge at an entity-level, and entity-level data analysis includes generation of an entity taxonomy, entity relations, and entity profiling. Following one or multiple specific facets of the query, at least one embodiment of the invention can include generating a variable-sized facet description, which can be input to a snippet-based proximity search engine indexed on technology (for example, IP) documents. With this search engine, fully relevant as well as partially relevant documents, as compared to the facet description, can be retrieved and linked back to the query.

FIG. 1 is a diagram illustrating an example embodiment, according to an aspect of the invention. By way of illustration, FIG. 1 depicts the encyclopedia Wikipedia® 112, which is used to convert both the prospective client and technology to named entities in Wikipedia® 112 based on a prospective client search in step 102 and a technology search in step 114. Being named entities in Wikipedia® 112, profiles for the prospective client and the technology can be derived directly via steps 104 and 108, respectively, from the rich text data in the corresponding Wikipedia® homepages. Company entities in Wikipedia® 112 can be used to refer to prospective clients and technology entities as well as relevant synonyms in Wikipedia® 112 can be used to discover (as in step 106) and/or refer to technologies.

Additionally, the internal linkages in Wikipedia® 112 provide one kind of relationship source between entities. For example, given a company's Wikipedia® homepage as the profile, there exists a number of out-links to technologies' Wikipedia® homepages. These out-links collectively define a new profile for the same company from the perspective of technologies. As a result, the company can be modeled as a point in the technology space, and thus, comparable to technology documents (such as patent documents) that utilize similar and/or identical portions of technology language.

As also depicted in FIG. 1, based on a database of patent documents 116, at least one embodiment of the invention includes generating a snippet-level word-document inverted index to support the search of patent documents with a technology profile as the query (as noted in step 110). After mapping companies and patents to the technology space, a company or a document (for example, a patent) may only span, for example, a few technology dimensions, either because the technology dictionary built on Wikipedia® 112 is incomplete or because the company profile is incomplete. The small size of spanned technology dimensions of one entity reduces its relevance chance of matching another entity.

Given a company, at least one embodiment of the invention includes extracting a set of technology terms from its wiki profile. Given a set of technical documents (for example, patents) produced and/or owned by the company, at least one embodiment of the invention includes extracting a second set of technology terms. These two sets of technology terms, in addition to synonyms and correlated terms thereof, collectively enrich the company profile. A synonym of a technology term can be defined, for example, as the synonym of technology term in Wikipedia®. A correlated term (referred to for purposes of illustration as A) of a technology term (referred to for purposes of this illustration as B) satisfies two conditions simultaneously: 1) A links to B in Wikipedia; 2) B links to A in Wikipedia.

Additionally, such an embodiment generates a query by using one technology profile or concatenating multiple technology profiles from the company profile (designated by the user), and submits this query to search for patents in step 110. The query defines one or multiple technical facets of the company. However, a patent document is commonly much longer than the query and covers more technical facets than the query. Therefore, as noted above, at least one embodiment of the invention includes generating a snippet-level word-document inverted index for patent documents. Based on this index, the query is only compared to individual snippets of similar size for browsing of the ultimately identified patent documents in step 118.

By way merely of example and illustration, consider the following example embodiment of the invention, which integrates Wikipedia® and a patent corpus on the selection of unlabeled data for a semi-supervised training on named entity classifier. 9,048,612 Wikipedia® titles are parsed. In Wikipedia®, a title a is sometimes redirected to another title b, and in such a scenario, a is referred to as the alias of b. The title b can have many title aliases simultaneously. If a is the alias of b, only b is classified because a will share the same classified label as b eventually. After removing aliases, there are 4,325,054 Wikipedia® titles as the named entity candidate set E pending for classification. Given any named entity candidate e∈E, the words in the full Wikipedia® article $d_e$ are used as the features to train the classifier. The Wikipedia® articles are filtered by removing moving any portions of an info-box, headers, category tags, figures, tables and vision tags incorporated for Wikipedia® display.

Continuing with the example, a set of 11,041,972 United States (U.S.) granted patents and/or patent applications, Europe granted patents and/or patent applications, and other international granted patents and/or patent applications are retrieved as the auxiliary knowledge base to assist the classification on Wikipedia®'s titles. Various auxiliary knowledge bases can result in various classification types for Wikipedia®, but the philosophy of the methodology is the same. Accordingly, such an example embodiment of the invention can include designing two named entity types for Wikipedia® classification, $C_1$: Company, and $C_2$: Technology. For the entity type $C_1$ (Company), all 1,133,876 unique assignees from patent data are used as the knowledge base. For the entity type $C_2$ (Technology), bigrams and trigrams extracted from patent titles and abstracts are used as the knowledge base. In this example, a total of 608,087 bigrams and 466,010 trigrams were extracted by setting the frequency threshold as 10.

For the entity type $C_1$, the training data include the names of 7,439 international companies with 2010 revenue greater than 500 millions U.S. dollars. For the entity type $C_2$, the training data include 6,000 reference taxonomy terms.

For each entity type (Ci, i∈{1, 2}), the example embodiment of the invention includes learning a function from a Wikipedia®-named entity candidate set E to two classes, $C_i$ and $\overline{C_i}$ (not $C_i$). Except for the Wikipedia® data W pending for classification, each classifier has starting training data T and an external knowledge base P from the patent data to learn the classification function $f_i$, as follows:

$$f_i: E \rightarrow \{C_i, \overline{C_i}\}, E \subset W \backslash T, P.$$

Such an example embodiment includes using a rule induction classifier based on a fast decision tree system to classify Wikipedia® named entities. This classifier takes advantage of the sparsity of text data, and applies a rule simplification method to convert a decision tree into a logically equivalent rule set R. The induced rule set R is the classifier model learned from the training data.

For extension of the classifier to other types of knowledge bases, such an example embodiment of the invention includes using the full Wikipedia® articles as the entity features. That is, given an entity $e \in E$, $f_i(e)$ depends on a conditional probability $p(C_i|d_e, R):d_e \times C_i \to [0, 1]$.

After eliminating common stop words and (high- and low-frequency) non-content-bearing words, the N most frequently occurring words in the Wikipedia® corpus are selected to include in the feature dictionary F. Based on this feature dictionary, each candidate entity's Wikipedia® full article is represented as a vector space model, $d_e = \{w_1, w_2, \ldots, w_N\}$, where $w_i$ is the weight of the i-th word of F in $d_e$, and wherein a term frequency-inverse document frequency (tf-idf) weighting scheme is used to compute each $w_i$.

Additionally, as detailed herein, at least one embodiment of the invention includes implementing a semi-supervised learning framework for named entity classification. As such, a small initial set of training seeds T can the only ground truth data used to learn some starting classification rules $R_0$. The starting training seeds T can be arbitrarily small so that it is manipulable by few human efforts, as long as starting training seeds T can offer classification rules. Certainly, the starting classification rules $R_0$ are often insufficient to represent patterns of the targeted named entity class. Suppose R is the optimal set of rules to learn in an ideal setting. The semi-supervised learning framework includes gradually optimizing the rule set from $R_0$ so that the rule set from $R_0$ eventually approaches $R:R_0 \to R_1 \to \ldots \to R_k \cong R$, after k iterations of bootstrap learning. For each bootstrap learning iteration, no additional ground truth data are available, but the knowledge from other data sources as well as the rule set learned in the previous step can be leveraged. Accordingly, the complete semi-supervised learning framework is:

$$\phi \xrightarrow{T} R_0 \xrightarrow{P} R_1 \xrightarrow{P} \ldots \xrightarrow{P} R_k.$$

Also, referring back to the above-noted example embodiment, for the entity class $C_1$ (Company), 7,439 international companies with 2010 revenue greater than 500 millions U.S. dollars are mapped to the Wikipedia® data, and 6,756 companies that have entries in Wikipedia® are identified as the initial training seeds to learn $R_0$. For the entity class $C_2$ (Technology), 6,000 reference taxonomy terms are mapped to the Wikipedia® data, and 3,862 technology entities that have Wikipedia® entries are identified as the initial training seeds to learn $R_0$. Note that both initial training seeds are positive examples.

FIG. 2 illustrates a data integration algorithm 202 for named entity classification, according to an aspect of the invention. In the algorithm 202 depicted in FIG. 2, there are two parameters, K and θ. K is used to control the maximum number of iterations for inducing new training data (for example, new rules).

In step 1.3 and step 2.4 of the algorithm 202, a decision tree is required to learn from the training data and the corresponding rules are required to infer from the decision tree. The rule induction classifier based on a fast decision tree system is used in one or more embodiments of the invention to induce rules from the decision tree learned from the training data.

After the tree grows fully, each path from the root to the leaf corresponds to a classification rule. The number of rules equals the number of leaves of the decision tree. Also, given any internal node in the tree (starting from the root node that contains all training data T) that contains a subset of training data, Γ, the task of a decision tree growing includes making the decision between splitting this node into two child nodes or not splitting the node, based on some feature $f \in F$ and its value v:

$$\Gamma \to \Gamma_{f,v}^1 \cup \Gamma_{f,v}^2,$$

$$\Gamma_{f,v}^1 = \{x_i \in \Gamma, x_{i,f} \geq v\} \text{ and } \Gamma_{f,v}^2 = \{x_i \in \Gamma, x_{i,f} < v\}.$$

By way of example, assume that (f, v)-split is the split means (that is, to search over all combinations (all possible splits) of features and their values) that minimizes the cost associated with this split. If the cost is less than a threshold, it is determined to make the split (that is, to grow the tree); otherwise, it is determined to stop growing the tree for this internal node (which becomes the leaf of the tree). The cost is defined as:

$$Q(f,v) = p_{f,v} g(p_{f,v}^1) + (1-p_{f,v}) g(p_{f,v}^2),$$

where $g(\cdot)$ is the entropy function and $p_{f,v}$ is the data distribution probability, and the overall proportion of training data that has the f feature value≤v. Also, $p_{f,v}^1 = p(y_i=1|x_i \in \Gamma_{f,v}^1)$ and $p_{f,v}^2 = p(y_i=1|x_i \in \Gamma_{f,v}^2)$ represent the probabilities that data in $\Gamma_{f,v}^1$ or $\Gamma_{f,v}^2$ are positive examples. By way of example, if both $p_{f,v}^1$ and $p_{f,v}^2$ are 0.5, the cost is maximized because the split results in a random guess. If both $p_{f,v}^1$ and $p_{f,v}^2$ are very small (close to 0) or very high (close to 1), this split is meaningless because the parent node Γ is already sufficiently differentiable. An effective split can include, for example, wherein one of $p_{f,v}^1$ and $p_{f,v}^2$ is relatively high and the other is relatively small.

As additional training data arrive, a fully grown tree will become more and more complicated. Also, due to the existence of noise in data, at least one embodiment of the invention includes pruning the decision tree so that noise data will be smoothed. To prune a decision tree, two scores $r(\Gamma_1)$ and $r(\Gamma_2)$ are assigned to the two children, $\Gamma_1$ and $\Gamma_2$, of an internal node Γ, respectively. The score $r(\Gamma_i)$ manifests the preference of child i to a given class. If both scores are larger than 0.5, indicating that both children are inclined to the same class, this split is identified as effectively not meaningful. In this case, these two children are removed. The score $r(\Gamma_i)$ is defined as:

$$r(\Gamma_i) = r(\Gamma) + \hat{w}_{\Gamma i} w_{\Gamma i} p(\Gamma_i).$$

As such, if a parent node has already inclined to a class (that is, $r(\Gamma)$ is high), it is potentially trivial to further split the parent node. If the situation at the parent node is unclear (that is, $r(\Gamma)$ is small), then $r(\Gamma_i)$ depends on additional factors identified as: $\hat{w}_{\Gamma i}$, $w_{\Gamma i}$ and $p(\Gamma_i)$.

$\hat{w}_{\Gamma i}$ $w_{\Gamma i}$ collectively measures the importance, ranging from [0, 1], of child $\Gamma_i$ with respect to the decision tree. As such, if $\Gamma_i$ is more differentiable and its own children are less differentiable, the score of $w\Gamma i$ is larger, and if $\Gamma_i$ is more differentiable and its ancestors are less differentiable, the score of $\hat{w}_{\Gamma i}$ is larger. In general, $\hat{w}_{\Gamma i} w_{\Gamma i}$ is larger, indicating that the child $r(\Gamma_i)$ is less trivial (with moderate size and reasonable class distinguishing ability). $p(\Gamma_i)$ represents the probability that data in $\Gamma^i$ are in a given class. This probability directly measures the data distribution of child i to a given class.

While learning the decision tree, each iteration of the semi-supervised learning method detailed in connection with one or more embodiments of the invention includes randomly sampling n entities $E_k$ to induce new training data.

The class distribution of $E_k$ can approximately follow the prior probability of the class in the knowledge base, which may be a small number in the data integration setting (if a general knowledge base is used to induce a specific class of the training data). Therefore, if both children originally incline to the negative class, the increment speeds of both $p(\Gamma_1)$ and $p(\Gamma_2)$ become increasingly larger. Both values would quickly reach the 0.5 threshold (as noted in the above example), and the corresponding two children would be pruned. If both children originally incline to the positive class, or one child originally inclines to the positive class and the other child originally inclines to the negative class, the unbalanced new training data $E_k$ tends to make this split more meaningful, and thus does not significantly affect the number of rules.

Accordingly, a knowledge-base based data integration model for inducing new training data has the capability of accelerating the maturity of a decision-tree based rule induction classifier. Therefore, $|R_k|-|R_{k-1}|$ can quickly converge to 0. As such, by way of example, a reasonable and small value may be set for 0 (that is, θ is set to be 0) in step 2.5 of algorithm 202 depicted in FIG. 2.

In at least one embodiment of the invention, one step of data integration includes relating the named entities that appear in the different knowledge bases; specifically, at least one embodiment of the invention includes determining that one named entity from one knowledge base refers to the same named entity as one named entity from another knowledge base. This step is also referred to herein as named entity resolution, which is required by step 1.1 and step 2.3 in algorithm 202 depicted in FIG. 2. By way of example, at least one embodiment includes applying the following rules sequentially to fulfill named entity resolution task:

Two names exactly match to each other;

One name wholly contains the other name (for instance, International Business Machines and International Business Machines Corporation);

One name is the acronym of another name (for instance, IBM and International Business Machines);

One name is the alias of another name in a knowledge base (for instance, ibm.com is the alias of IBM in Wikipedia® by linking to the same Wikipedia® article; Armonk Business Machines Corporation is the alias of IBM in a patent corpus by sharing the same patent assignee code); and Two names are very similar in terms of edit distance and term-based vector space cosine similarity. Given two names, $x_i$ and $x_j$, $A(x_i)$ and $A(x_j)$ represent the alias set of each name. If a name $x_i$ does not have other aliases, $A(x_i)=x_i$. As such, at least one embodiment of the invention includes computing the following similarities:

edit distance (ed):

$$\frac{1}{\max(|a|,|b|)} \arg\min_{ed} ed(a,b), a \in A(x_i), b \in A(x_j);$$

and term-based vector space cosine similarity (cos), tfidf weighting:

$$\arg\max_{cos} \cos(a,b), a \in A(x_i), b \in A(x_i).$$

If the edit distance is less than a threshold (for example, 0.25), and the cosine similarity is above a threshold (for example, 0.9), these two named entities can be identified as the same. For instance, "International Business Machines" is a typographical error of "International Business Machines" with a low edit distance and a high cosine similarity. Accordingly, these two entries would be grouped and/or identified as the same named entity.

Determining the relation of recommended patents to the query company includes determining relevant technology terms and using such terms as drivers of queries to send against the index. In an example embodiment of the invention, the user is presented with a set of technology terms from which he or she can choose in a tree structure based on a technology hierarchy.

Additionally, at least one embodiment of the invention includes implementing a proximity search operation in document retrieval. In executing a proximity search operation, such an embodiment of the invention includes decomposing the documents in a corpus into smaller units of documents referred to herein as snippets. As used in one or more example embodiments of the invention, a snippet includes three consecutive sentences from an original document.

Accordingly, a given document is decomposed into multiple snippets that are shorter in length than the original document. Each snippet is treated as a separate document and is indexed. Note that decomposing a document into snippets and indexing the individual snippets introduces an implicit proximity search operator. On receiving a user query, the search system identifies snippets containing one or more query terms. These snippets can be ranked using a sorted function that can assign higher scores to snippets that contain multiple query terms.

Note also that because each snippet is a continuous segment of the original document text, a snippet containing multiple query term implies that in the original document from which the snippet was generated, query terms are present in close proximity to each other. Thus, term proximity information can be obtained without computing the distances between query terms present in the document at query time. The number of words or sentences in a snippet can be varied depending upon the application.

In addition to a ranked list of snippets as output, users may be interested in obtaining relevant full documents rather than merely snippets thereof. As such, to obtain a ranked list of documents, for each document, the scores of all snippets generated thereby is determined and assigned to the corresponding document. Thus, documents having multiple matching snippets for a given query are assigned a higher score than those documents that do not. Also, snippet scores can be merged into document scores in various different ways also depending upon the requirement of the application.

Additionally, at least one embodiment of the invention includes extending a proximity search operator to accommodate very long queries by decomposing a long query into smaller sub-queries. For example, if the input query includes a paragraph of text, the paragraph can be decomposed into its constituent sentences and each sentence can then be used as a sub-query. The results of the sub-queries can be merged to create a final ranked list for the paragraph query. An example implementation of such an aspect of the invention is summarized as follows:

1) Create a similarity query based on each sentence of an input paragraph (stop-words can optionally be removed from the sentences);

2) Take the top x snippets (based, for example, on a pre-determined number) based on word similarity (that is, the more unique words in the original input that the snippet contains, the higher the score corresponding to that snippet), and remove duplicate snippets for each document (keeping only the version with the best score);

3) As described above, transform the snippet results into document results for each sentence sub-query; and 4) Sum scores for each document and sort by the final scores. A pre-determined number of documents can then be shown to the user in decreasing order of score.

The number of snippets that are generated for a given document is s−l, wherein s is the number of sentences in the document and l is the number of sentences in a snippet. Accordingly, if there are m documents in the corpus, the total number of effective documents that are in the search system's index will be m(s−l), which can result in long posting lists. As such, to reduce the number of posting lists, at least one embodiment of the invention includes creating corpus-specific stop-words that include the most frequently appearing words in the corpus.

Additionally, at least one embodiment of the invention includes placing focus and consideration upon the rarest term(s) in a given sub-query (that is, the term(s) used with the least frequency). When determining the rarest term(s), the frequency of the appearance of such a term(s) is set higher than a given threshold. Accordingly, the rarest term is the term with highest identified least document frequency (LDF), provided the document frequency is above a pre-defined threshold. Therefore, when a sentence sub-query is received, the term with the least document frequency above the set threshold is identified. This term is referred to herein as $T_{min}$. The posting lists of remaining terms in the query are merged using an OR operation, and the resulting set is combined with the posting list of $T_{min}$. As a result, the number of documents and/or snippets that the ranking function has to rank will never be larger than the size of the posting list $T_{min}$. This selective operation can be represented mathematically as $P_{T_{min}} \cap (\cup_{T \in S \setminus T_{min}} P_T)$, where, S is the set of query terms in the sentence and $P_T$ represents the posting list of term T in S.

Figure 3:
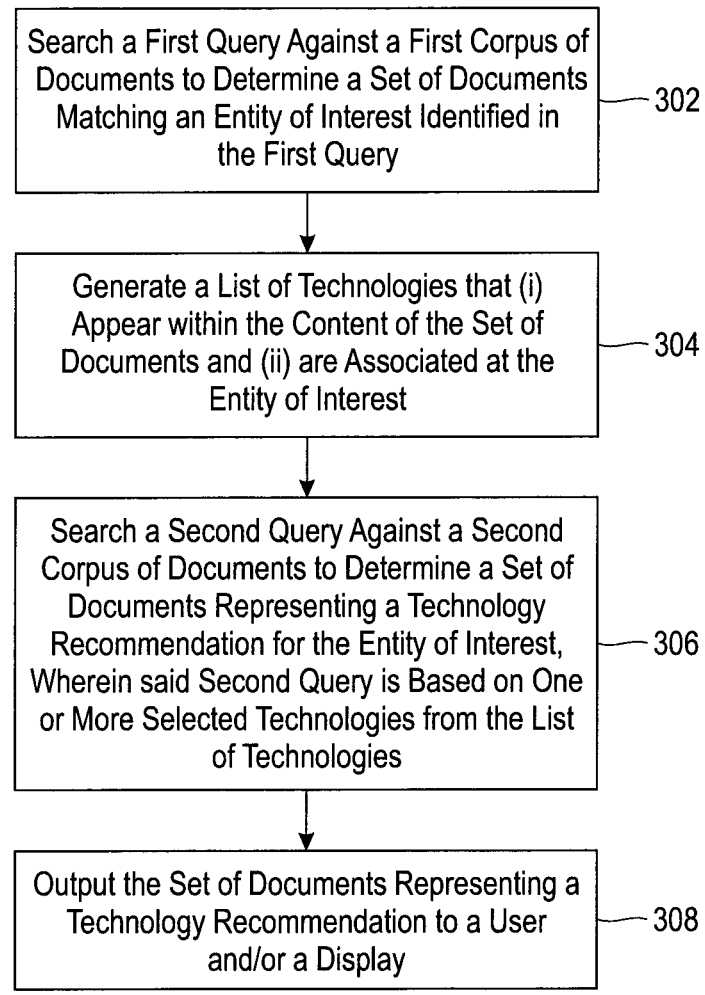
FIG. 3 is a flow diagram illustrating techniques according to an embodiment of the invention.

FIG. 3 is a flow diagram illustrating techniques according to an embodiment of the present invention. Step 302 includes searching a first query against a first corpus of documents to determine a set of documents matching an entity of interest identified in the first query. Determining the set of documents matching the entity of interest can include comparing metadata (such as information pertaining to entity title and/or entity affiliation) of the first corpus of documents with a name of the entity of interest. Also, determining the set of documents matching the entity of interest can include applying one or more distance metrics to the first query and the first corpus of documents.

Step 304 includes generating a list of technologies that (i) appear within the content of the set of documents and (ii) are associated to the entity of interest. Step 306 includes searching a second query against a second corpus of documents to determine a set of documents representing a technology recommendation for the entity of interest, wherein said second query is based on one or more selected technologies from the list of technologies. Searching a second query against a second corpus of documents can include submitting the second query into a document search engine.

Step 308 includes outputting the set of documents representing a technology recommendation to a user and/or a display. Outputting the set of documents can include outputting a pre-determined number of documents from the set of documents representing a technology recommendation to a user and/or a display.

The techniques depicted in FIG. 3 can additionally include receiving the identification of the entity of interest from a user, as well as modeling the first query and the second query using the same language dictionary. Further, at least one embodiment of the invention includes enabling a download of the set of documents output as the technology recommendation.

Also, the techniques depicted in FIG. 3 can include organizing said list of technologies by building a technology graph wherein the nodes represent technology terms and a directed edge exists from a first technology term to a second technology term if a hyperlink to the second technology term exists in a reference webpage associated with the first technology term. Further, at least one embodiment of the invention includes determining the first technology term and the second technology term to be relevant to each other if there exist (i) a first directed path in the technology graph starting from the first technology term and ending at the second technology term, and (ii) a second directed path in the technology graph starting from the second technology term and ending at the first technology term, wherein the length of each directed path is less than a given threshold.

At least one embodiment of the invention can also include receiving a name of an entity of interest to be used as a first query, searching the first query against a first corpus of documents to determine a set of documents matching the entity of interest, and generating a list of technologies that (i) appear within the content of the set of documents and (ii) are associated to the entity of interest. Such an embodiment can further include receiving a second query based on one or more technologies from the list of technologies, submitting the second query into a document search engine to determine a set of documents representing a technology recommendation for the entity of interest, and outputting the set of documents representing a technology recommendation to a user and/or a display as a ranked list of documents.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored to in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and configured to perform exemplary method steps.

Figure 4:
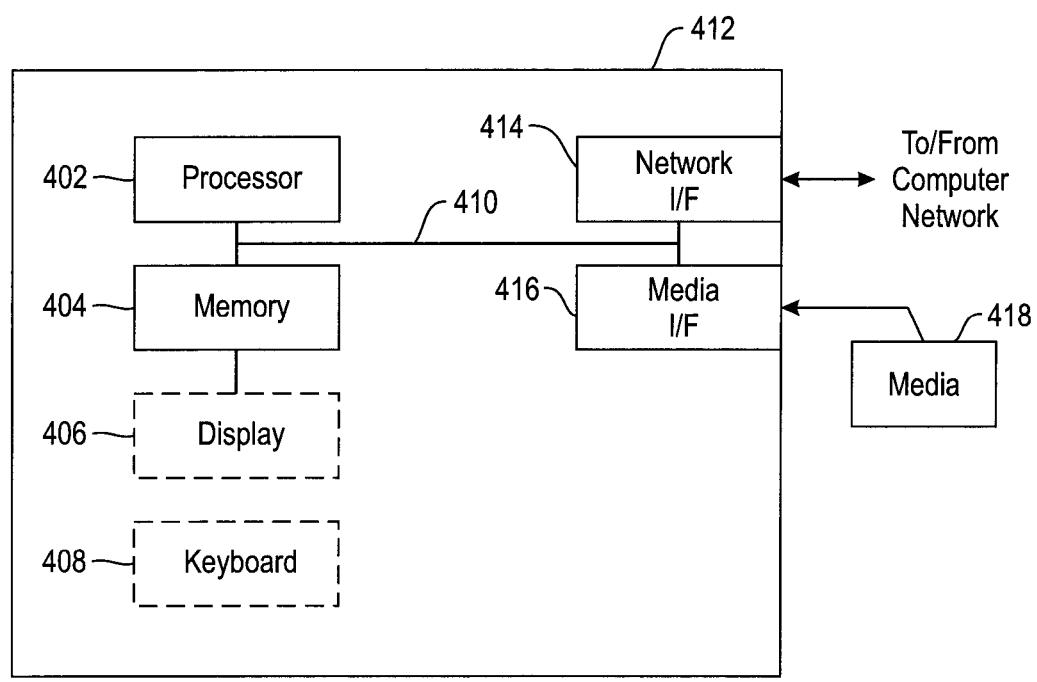
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters. As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, radio frequency (RF), etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, generating a prospective client-driven technology recommendation system to enable the automatic search of technologies.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

modeling a first query in a given vector space, wherein the given vector space comprises multiple word and/or term dimensions from a predetermined language source;

searching the first query against a first corpus of documents to determine a set of documents matching an entity of interest identified in the first query;

generating a list of technologies that (i) appear within the content of the set of documents and (ii) are associated to the entity of interest;

organizing said list of technologies by building a graph wherein the nodes of the graph represent technology terms and a directed edge exists from a first technology term to a second technology term if a hyperlink to the second technology term exists in a reference webpage associated with the first technology term;

modeling a second query in the given vector space, wherein the second query is based on one or more selected technologies from the graph;

searching the second query against a second corpus of documents to determine a set of documents representing a technology recommendation for the entity of interest, wherein the second corpus of documents comprises a corpus of intellectual property assets, and wherein the set of documents representing a technology recommendation comprises a subset of the intellectual property assets proposed for licensing and/or selling to the entity of interest; and outputting the set of documents representing the technology recommendation to a user and/or a display;

wherein the steps are carried out by at least one computing device.

2. The method of claim 1, comprising:
receiving the identification of the entity of interest from a user.

3. The method of claim 1, wherein said determining the set of documents matching the entity of interest comprises comparing metadata of the first corpus of documents with a name of the entity of interest.

4. The method of claim 3, wherein said metadata of the first corpus of documents comprises information pertaining to entity title and/or entity affiliation.

5. The method of claim 1, wherein said determining the set of documents matching the entity of interest comprises applying one or more distance metrics to the first query and the first corpus of documents.

6. The method of claim 1, wherein said searching a second query against a second corpus of documents comprises submitting the second query into a document search engine.

7. The method of claim 1, comprising:
determining the first technology term and the second technology term to be relevant to each other if there exists (i) a first directed path in the technology graph starting from the first technology term and ending at the second technology term, and (ii) a second directed path in the technology graph starting from the second technology term and ending at the first technology term, wherein the length of each directed path is less than a given threshold.

8. The method of claim 1, wherein said outputting the set of documents comprises outputting a pre-determined number of documents from the set of documents representing a technology recommendation to a user and/or a display.

9. The method of claim 1, comprising:
enabling download of the set of documents output as the technology recommendation.

10. An article of manufacture comprising a non-transitory computer readable storage medium having computer readable instructions tangibly embodied thereon which, when implemented, cause a computer to carry out a plurality of method steps comprising:
modeling a first query in a given vector space, wherein the given vector space comprises multiple word and/or term dimensions from a predetermined language source;
searching the first query against a first corpus of documents to determine a set of documents matching an entity of interest identified in the first query;
generating a list of technologies that (i) appear within the content of the set of documents and (ii) are associated to the entity of interest;
organizing said list of technologies by building a graph wherein the nodes of the graph represent technology terms and a directed edge exists from a first technology term to a second technology term if a hyperlink to the second technology term exists in a reference webpage associated with the first technology term;
modeling a second query in the given vector space, wherein the second query is based on one or more selected technologies from the graph;
searching the second query against a second corpus of documents to determine a set of documents representing a technology recommendation for the entity of interest, wherein the second corpus of documents comprises a corpus of intellectual property assets, and wherein the set of documents representing a technology recommendation comprises a subset of the intellectual property assets proposed for licensing and/or selling to the entity of interest; and
outputting the set of documents representing the technology recommendation to a user and/or a display.

11. The article of manufacture of claim 10, wherein said determining the set of documents matching the entity of interest comprises comparing metadata of the first corpus of documents with a name of the entity of interest.

12. The article of manufacture of claim 10, wherein said determining the set of documents matching the entity of interest comprises applying one or more distance metrics to the first query and the first corpus of documents.

13. The article of manufacture of claim 10, wherein said searching a second query against a second corpus of documents comprises submitting the second query into a document search engine.

14. The article of manufacture of claim 10, wherein said outputting the set of documents comprises outputting a pre-determined number of documents from the set of documents representing a technology recommendation to a user and/or a display.

15. The article of manufacture of claim 10, wherein the method steps comprise:
enabling download of the set of documents output as the technology recommendation.

16. A system comprising:
a memory; and
at least one processor coupled to the memory and configured for:
modeling a first query in a given vector space, wherein the given vector space comprises multiple word and/or term dimensions from a predetermined language source;
searching the first query against a first corpus of documents to determine a set of documents matching an entity of interest identified in the first query;
generating a list of technologies that (i) appear within the content of the set of documents and (ii) are associated to the entity of interest;
organizing said list of technologies by building a graph wherein the nodes of the graph represent technology terms and a directed edge exists from a first technology term to a second technology term if a hyperlink to the second technology term exists in a reference webpage associated with the first technology term;
modeling a second query in the given vector space, wherein the second query is based on one or more selected technologies from the graph;
searching the second query against a second corpus of documents to determine a set of documents representing a technology recommendation for the entity of interest, wherein the second corpus of documents comprises a corpus of intellectual property assets, and wherein the set of documents representing a technology recommendation comprises a subset of the intellectual property assets proposed for licensing and/or selling to the entity of interest; and outputting the set of documents representing the technology recommendation to a user and/or a display.

17. A method comprising:

receiving a name of an entity of interest to be used as a first query;

modeling the first query in a given vector space, wherein the given vector space comprises multiple word and/or term dimensions from a predetermined language source;

searching the first query against a first corpus of documents to determine a set of documents matching the entity of interest;

generating a list of technologies that (i) appear within the content of the set of documents and (ii) are associated to the entity of interest;

organizing said list of technologies by building a graph wherein the nodes of the graph represent technology terms and a directed edge exists from a first technology term to a second technology term if a hyperlink to the second technology term exists in a reference webpage associated with the first technology term;

receiving a second query based on one or more technologies from the graph;

modeling the second query in the given vector space;

submitting the second query into a document search engine to search against a second corpus of documents to determine a set of documents representing a technology recommendation for the entity of interest, wherein the second corpus of documents comprises a corpus of intellectual property assets, and wherein the set of documents representing a technology recommendation comprises a subset of the intellectual property assets proposed for licensing and/or selling to the entity of interest; and outputting the set of documents representing the technology recommendation to a user and/or a display as a ranked list of documents;

wherein the steps are carried out by at least one computing device.

* * * * *